US006760690B2

(12) United States Patent
Takahashi

(10) Patent No.: US 6,760,690 B2
(45) Date of Patent: Jul. 6, 2004

(54) BACKGROUND NOISE ELIMINATING APPARATUS AND METHOD, AND STORAGE MEDIUM STORING PROGRAM REALIZING SUCH METHOD

(75) Inventor: Akio Takahashi, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 239 days.

(21) Appl. No.: 09/944,239

(22) Filed: Aug. 31, 2001

(65) Prior Publication Data

US 2002/0029132 A1 Mar. 7, 2002

(30) Foreign Application Priority Data

Sep. 4, 2000 (JP) ....................................... 2000-267576

(51) Int. Cl.7 ................................................ H04B 15/00

(52) U.S. Cl. ....................................... 702/191; 324/613

(58) Field of Search .................. 381/13, 71.1; 702/191, 702/194, 195; 324/613, 618, 676–677, 76.12, 76.19; 375/346

(56) References Cited

U.S. PATENT DOCUMENTS 4,703,507 A * 10/1987 Holden ........................ 381/94
5,373,460 A * 12/1994 Marks, II ................... 708/300
6,377,637 B1 * 4/2002 Berdugo ...................... 375/746
6,385,261 B1 * 5/2002 Tsuji et al. ................. 375/746
6,442,280 B1 * 8/2002 Ito .............................. 381/83

FOREIGN PATENT DOCUMENTS

| | | |
|---|---|---|
| EP | 0930719 | 1/1999 |
| JP | 62-120732 | 6/1987 |
| JP | 5-62343 | 3/1993 |
| JP | 06-351095 | 12/1994 |
| JP | 09-258749 | 10/1997 |

* cited by examiner

*Primary Examiner*—Marc S. Hoff
*Assistant Examiner*—Paul L Kim
(74) *Attorney, Agent, or Firm*—Pillsbury Winthrop LLP

(57) ABSTRACT

A CPU of an effector calculates envelopes of an impulse response waveform from sample data of impulse response waveform data supplied from a microphone via an A/D converter circuit. Next, CPU detects a section during which a slope of the detected envelopes takes a value near "0" during a predetermined time or longer. CPU calculates an average value of sample data during the detected section to correct a DC offset. Thereafter, CPU acquires a maximum value of absolute values among the sample data during the detected section, and determines this maximum value as a background noise component value. The background noise components are removed from each sample data constituting the impulse response waveform data.

15 Claims, 9 Drawing Sheets

BACKGROUND NOISE ELIMINATING APPARATUS AND METHOD, AND STORAGE MEDIUM STORING PROGRAM REALIZING SUCH METHOD

This application is based on Japanese Patent Application 2000-267576, filed on Sep. 4, 2000, the entire contents of which are incorporated herein by reference.

BACKGROUND OF THE INVENTION

A) Field of the Invention

The present invention relates to a background noise eliminating apparatus and method suitable for eliminating background noise components from an impulse response waveform, and to a storage medium storing a program realizing such a method.

B) Description of the Related Art

An effector for generating sounds given a sound effect of an acoustic space such as a hall and a church is known, which effector records an impulse response waveform of the acoustic space and superposes a sample data sequence of the impulse response waveform upon sample data such as music sounds.

Sample data of an impulse response waveform of an acoustic space can be obtained by sampling an analog signal waveform of sounds in the acoustic space converted into an electric signal by a microphone. Sample data of an impulse response waveform is generally mixed with unnecessary background noise components in addition to main sounds.

The background noises are, for example, air conditioning sounds in a hall, illumination hums and the like picked up by a microphone.

As an effector gives a sound effect, background noise components contained in an impulse response waveform are superposed upon sample data such as music sounds. The sound effect initially intended by the effector cannot be obtained.

From the above reason, it is necessary to eliminate background noise components contained in an impulse response waveform. Conventionally, background noise components have been eliminated (or reduced) by the following two methods.

(First Method)

Two processes are repeated until background noises are eliminated. One process is to eliminate a signal in a frequency band assumed to contain background noises from an impulse response waveform by using an equalizer, and the other process is to reproduce sounds of the impulse response waveform and confirm whether background noises are still contained.

(Second Method)

Frequencies of an impulse response waveform are analyzed by fast Fourier transform (FFT). An operator identifies the frequency band containing background noise components from the analysis results, and selects a band elimination filter for removing the identified frequency band. By using the selected band-elimination filter, signal components in the frequency band assumed by the operator to contain background noise components are removed from the impulse response waveform.

The above-described background noise eliminating methods are, however, associated with the following problems.

(First Method)

An operator is forced to change or finely adjust the frequency characteristics of an impulse response waveform by operating an equalizer and to listen reproduced sounds to confirm the results. It takes, therefore, some time for the background noise eliminating work. Reproductivity is not possible because each operator may show different results of the background noise component eliminating work.

(Second Method)

An operator is forced to select a band-elimination filer and set various parameters necessary for filtering. Reproductivity is not possible because each operator may show different results of the background noise component eliminating work. In order to eliminate background noise components, frequency analysis by FFT and a filtering process are required so that the background noise component eliminating work is complicated and takes some labor.

SUMMARY OF THE INVENTION

It is an object of the present invention to provide a background noise eliminating apparatus and method capable of automatically deriving background noise components from an impulse response waveform and eliminating the background noise components, and to a storage medium storing a program realizing such a method.

According to one aspect of the present invention, there is provided a background noise eliminating apparatus, comprising: envelope detecting means for detecting an envelope of an impulse response waveform from a sample data sequence of the impulse response waveform; section detecting means for detecting a section during which a slope of the envelope detected by said envelope detecting means takes a value in a predetermined range including "0" during a predetermined time or longer; means for determining a background noise component value in accordance with sample data of the impulse response waveform during the section detected by said section detecting means; and background noise component eliminating means for reducing an absolute value of the sample data of the impulse response waveform by the background noise component value determined by said determining means.

Background noise components are automatically detected and removed from an impulse response waveform. A background noise component eliminating work can be automatically performed and a work time taken to eliminate background noise components can be shortened. The results of the background noise component eliminating works made by different operators are made uniform, and the reproductivity of the works can be maintained. The background noise component eliminating process can be realized with a simple structure.

DETAILED DESCRIPTION OF THE PREFERRED EMBODIMENTS

Embodiments will be described in order to facilitate understanding of the invention. The embodiments are illustrative examples of the invention and are not intended to limit the scope of the invention. Various modifications are possible without departing from the scope and spirit of the invention.

A-1: Constitution of Embodiment

Figure 1:
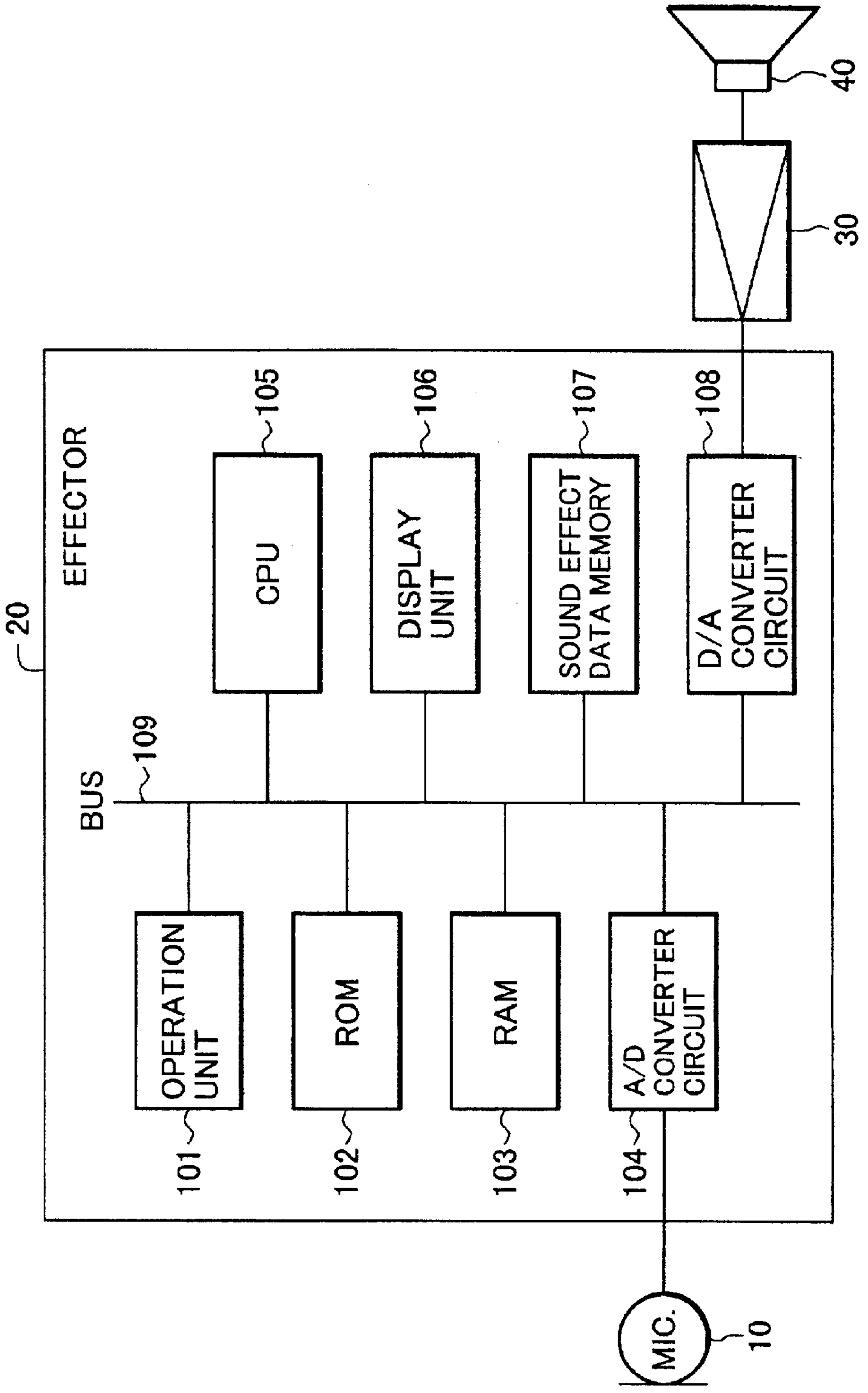
FIG. 1 is a block diagram showing an example of the structure of an effector according to an embodiment of the invention.

FIG. 1 is a block diagram showing an example of the structure of an effector 20 according to an embodiment of the invention.

An effector 20 is an apparatus for generating sounds given a sound effect of an acoustic space such as a hall and a church, which effector records an impulse response waveform of the acoustic space and superposes a sample data sequence of the impulse response waveform upon sample data such as music sounds.

This effector 20 provides a function of a background noise eliminating apparatus. As shown in FIG. 1, the effector 20 has an operation unit 101, a read only memory (ROM) 102, a random access memory (RAM) 103, an analog/digital (A/D) converter circuit 104, a central processing unit (CPU) 105, a display unit 106, a sound effect data memory 107 and a digital/analog (D/A) converter circuit 108. A bus 109 interconnects these circuit components. A microphone 10 is connected to the A/D converter circuit 104, and an amplifier 30 connected with a speaker 30 is connected to the D/A converter circuit 108.

The operation unit 101 has an operation panel with keys. An operator manipulates each key to supply a corresponding signal to CPU 105. ROM 102 stores a program and data for controlling the effector 20. RAM 103 temporarily stores various data necessary for executing a registration process, a background noise component eliminating process and the like to be described later.

The A/D converter circuit 104 acquires an instantaneous value of an analog signal waveform of sounds picked up with the microphone 10 each time a sampling clock of a predetermined frequency is supplied, and outputs digital data (sample data) corresponding to the instantaneous value.

CPU 105 executes the program stored in ROM 102 to control each circuit component connected to the bus 109. In accordance with a predetermined algorithm, CPU 105 automatically detects background noise components from sample data of an impulse response waveform, and eliminates the background noise components.

The display unit 106 has a liquid crystal display panel and a driver circuit for controlling the liquid crystal display panel. The sound effect data memory 107 stores impulse response waveform data to be superposed upon sample data such as music sounds for giving sound effects.

The effector 20 superposes the sound effect impulse response waveform data stored in the sound effect data memory 107 upon sample data such as music sounds, to thereby generate digital sound data given the sound effect. This digital data is reproduced as sounds from the speaker 40 via the D/A converter circuit 108 and amplifier 30.

The effector 20 of this embodiment has the structure described above.

A-2: Operation of Embodiment

The operation of the effector will be described with reference to FIGS. 2 to 7.

The effector 20 displays a menu on the display unit 106. An operator selects a desired item in the menu. If the operator selects a sound effect data acquisition mode from the menu and a corresponding signal is supplied from the operation unit 101, CPU 105 executes the following routine of a registration process.

(1) Registration Process

Figure 2:
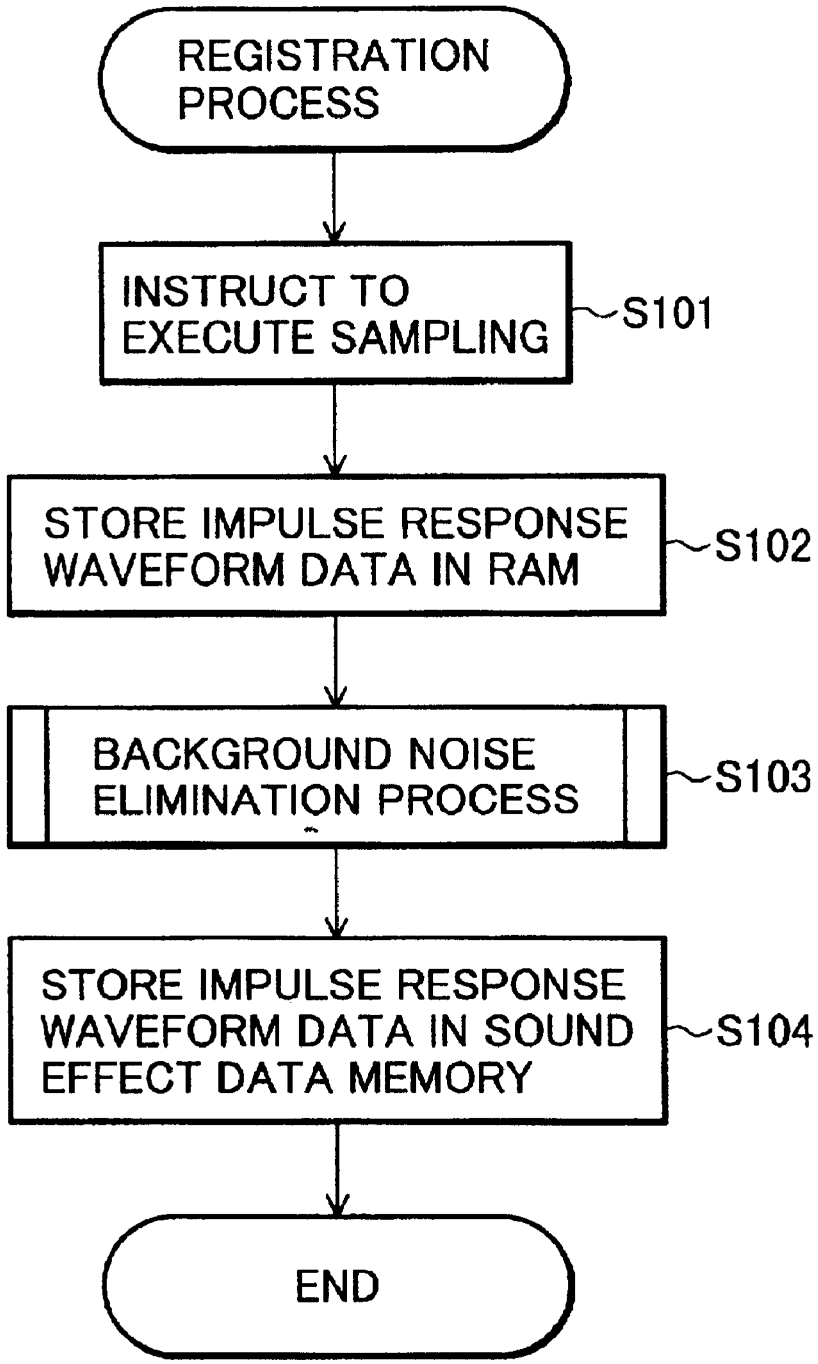
FIG. 2 is a flow chart illustrating a registration operation to be executed by a CPU of the effector of the embodiment.

FIG. 2 is a flow chart illustrating a registration process to be executed by CPU 105 of the effector 20 of this embodiment.

As shown in FIG. 2, upon a key operation by an operator notifying a start timing of acquiring impulse response waveform data, CPU 105 instructs a tone generator (not shown in the drawing) to generate an impulse sound and instructs the A/D converter circuit 104 to execute sampling (Step S101).

In response to this instruction, the A/D converter circuit 104 starts a sampling process.

Figure 3:
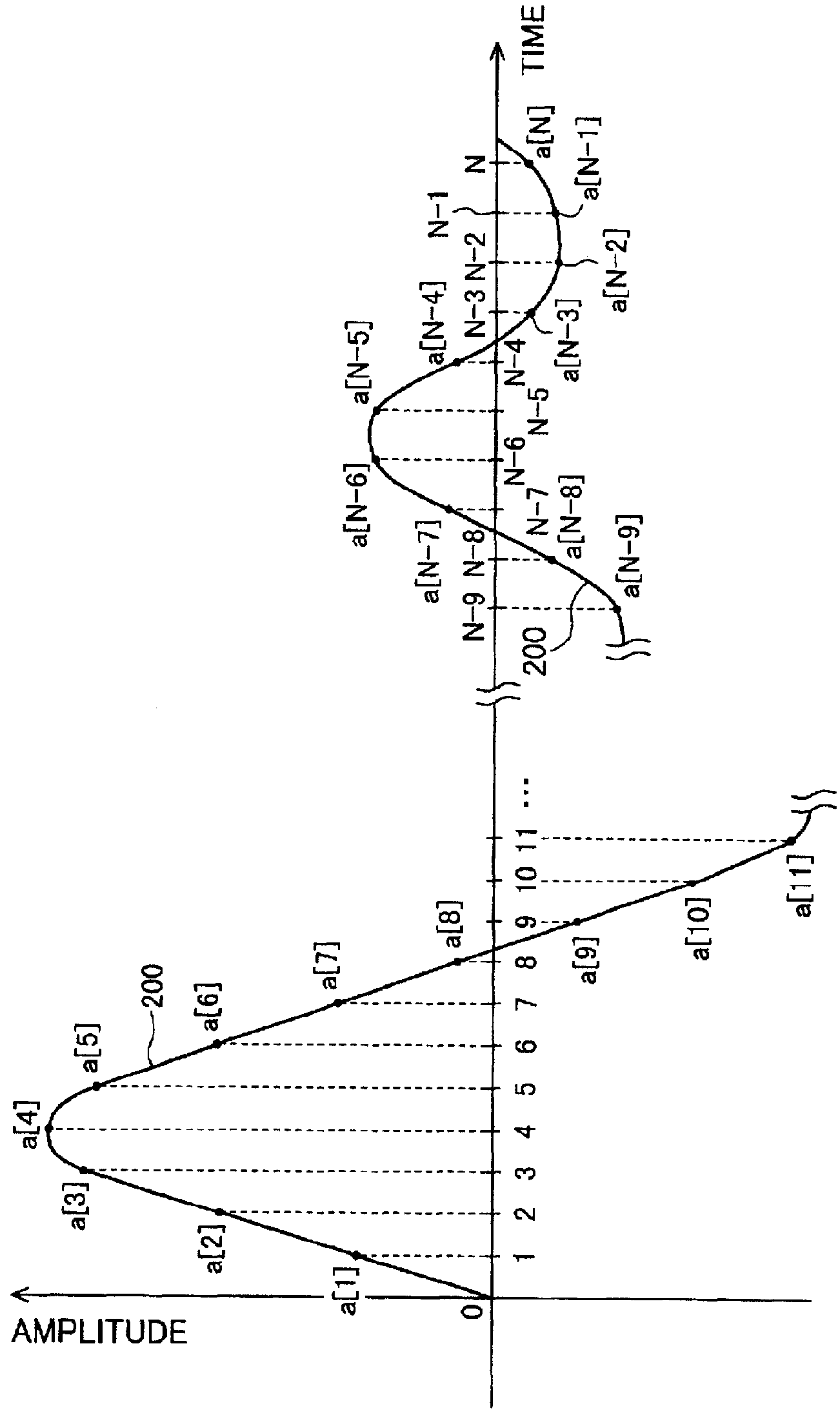
FIG. 3 is a schematic diagram illustratively showing a sampling operation to be executed by an A/D converter circuit of the embodiment.

This sampling process will be described specifically. First, the microphone 10 collects sounds in the acoustic space in which the microphone 10 is installed, and converts the collected sounds into an analog signal waveform. As shown in FIG. 3, the A/D converter circuit 104 outputs sample data a[n] (n=1, 2, 3 . . . ) corresponding to instantaneous values of an analog signal waveform 200 converted by the microphone 10 at sampling clock generating timings [n] (n=1, 2, 3, . . . , N−2, N−1, N (last value)).

Next, CPU 105 stores the sample data of the impulse response waveform output from the A/D converter circuit 104 into RAM 103 (Step S102), and thereafter executes a background noise component eliminating process for the sample data of the impulse response waveform (Step S103). The details of the background noise component eliminating process will be later given. CPU 105 then stores the sample data of the impulse response waveform with the background noise components being removed by the background noise component eliminating process into the sound effect data memory 107 as sound effect data (Step S104) to thereafter terminate the registration process.

A plurality of impulse response waveform data sets can be stored in the sound effect data memory 107. In order to distinguish between a plurality of impulse response waveform data sets, when the impulse response waveform data is stored at Step S104, the name of the impulse response waveform data is entered by the operator by using keys. The data name and impulse response waveform data related to each other can therefore be stored in the sound effect data memory 107.

(2) Background Noise Eliminating Process

Figure 4:
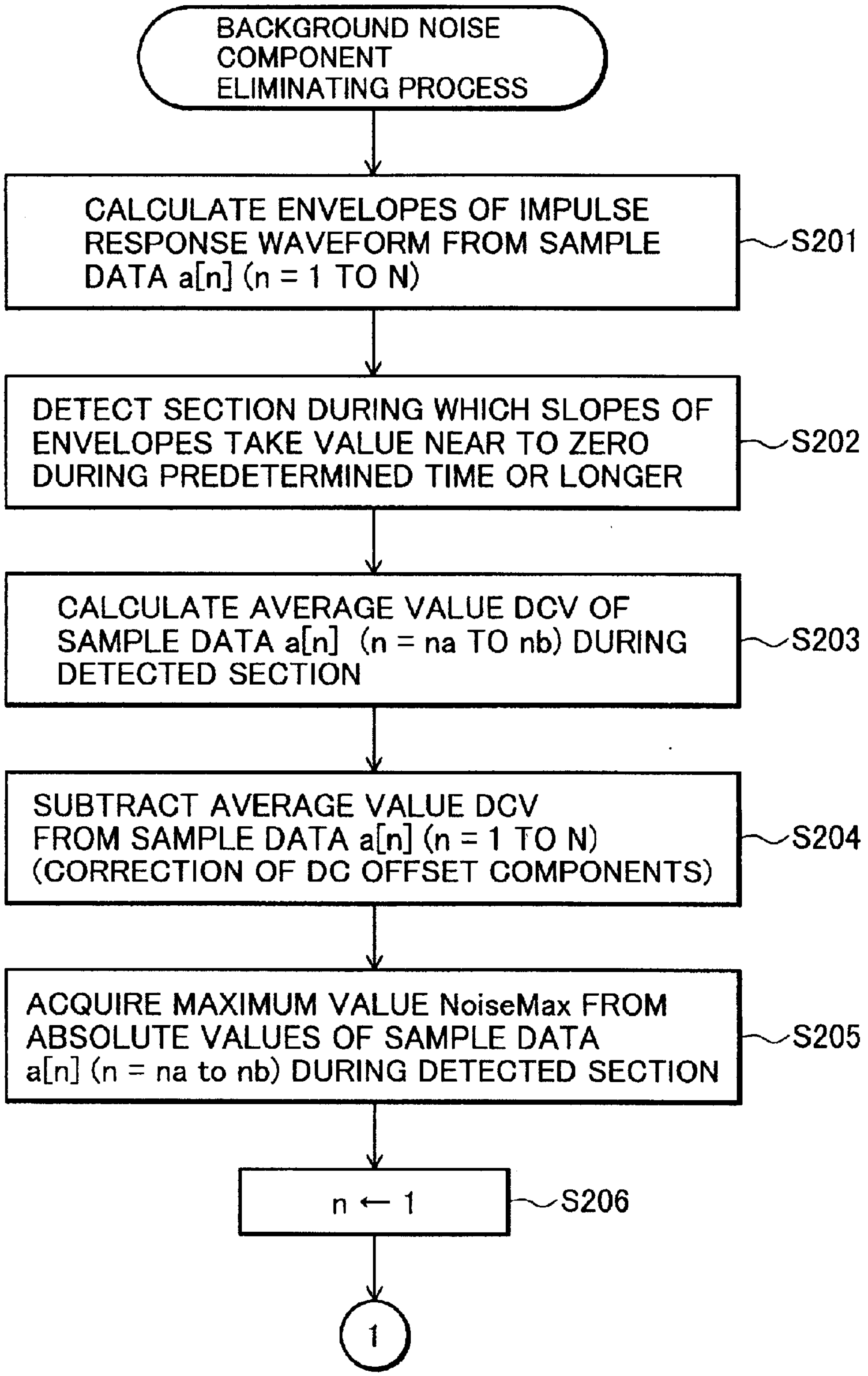
FIGS. 4 and 5 are flow charts illustrating a background noise component eliminating process to be executed by CPU of the effector of the embodiment.
Figure 5:
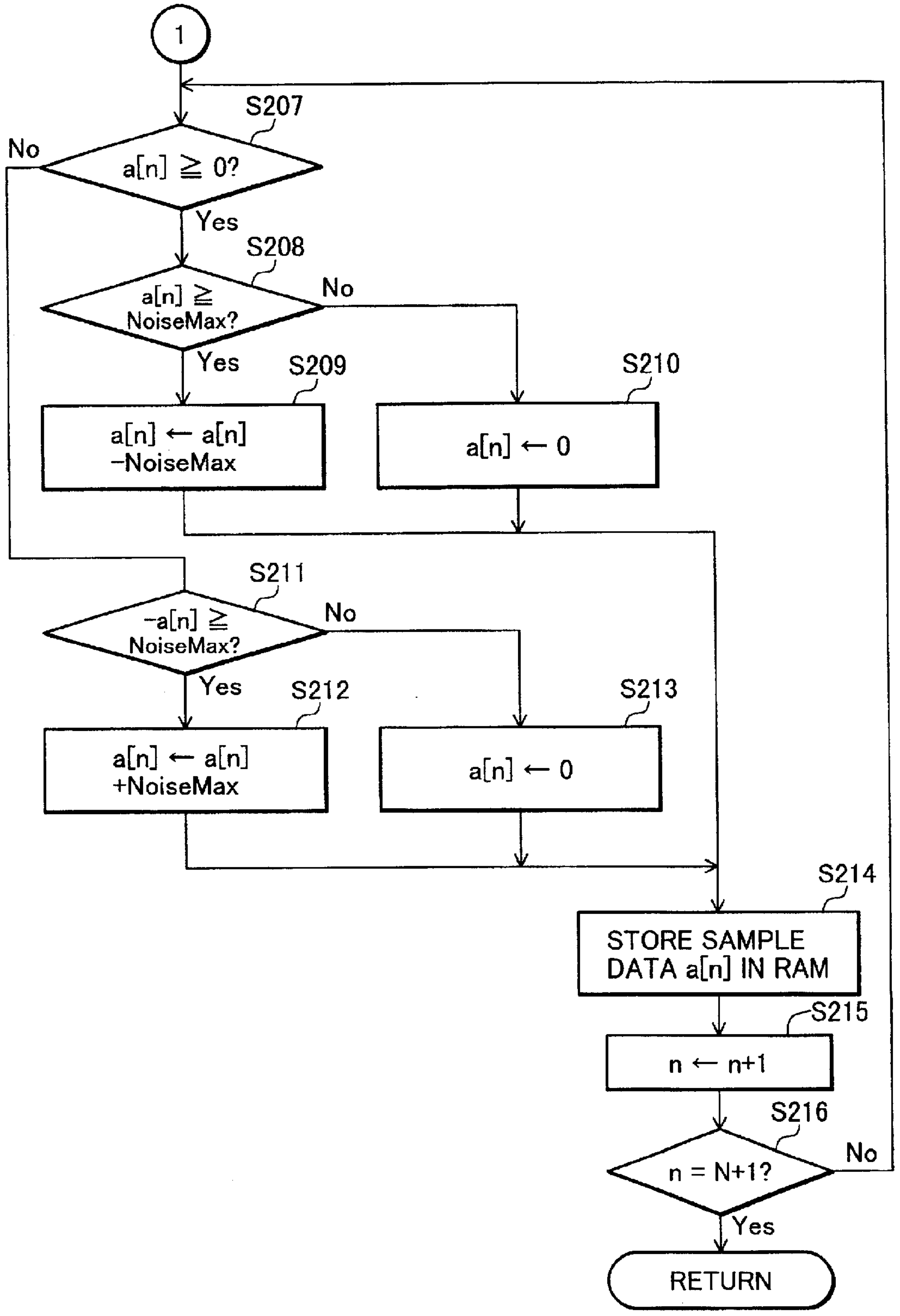

FIGS. 4 and 5 are flow charts illustrating a background noise component eliminating process to be executed by CPU 105 of the effector 20 of the embodiment.

A routine of this background noise component eliminating process is executed at Step S103 of the registration process. As shown in FIG. 4, CPU 105 calculates envelopes of the impulse response waveform from each sample data a[n] (n=1–N) of the impulse response waveform stored in RAM 103 at Step S102 of the registration process (Step S201).

Figure 6A:
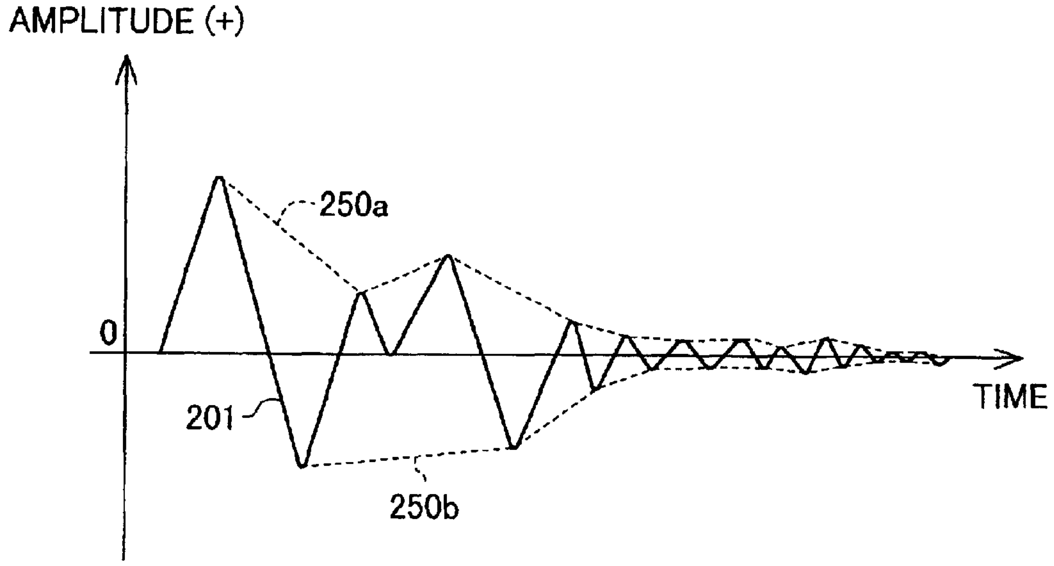
FIGS. 6A and 6B and FIG. 7 are schematic diagrams illustratively showing the outline of the background noise eliminating process of the embodiment.

There are two calculated envelopes. More specifically, as shown in FIG. 6A, Step S201 calculates two envelopes 250*a* and 250*b* which are formed by connecting peaks respectively on the plus and minus sides of the impulse response waveform 201 constituted of the sample data a[n] (n=1 to N).

Figure 6B:
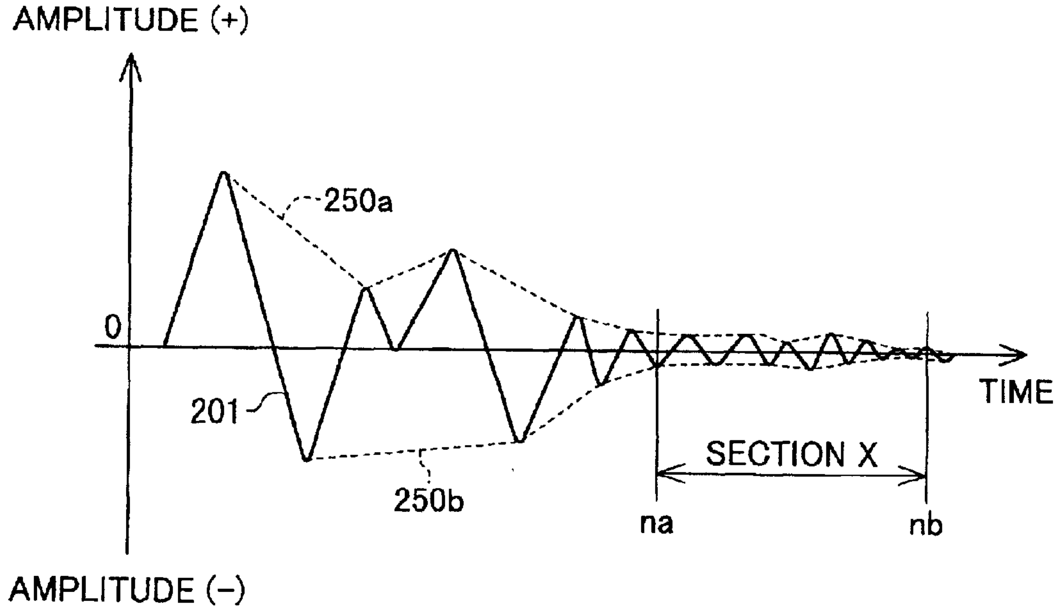

Next, as shown in FIG. 6B, CPU 105 detects a section X during which the slopes of the calculated envelopes 250*a* and 250*b* take a value near to "0 (zero)" during a predetermined time or longer (Step S202). The section X detected at this Step S202 is a section during which it can be presumed that only the background noise components exist after the impulse response is terminated. It is therefore possible to obtain the values of background noise components during the section X from the sample data.

In this embodiment, a change in the slope of the envelope is monitored, and when the slope does not change during a predetermined time or longer, it is judged that the impulse response was terminated. In the following description, the sample data in the section X is represented by a[n] (n=na to nb).

Next, CPU 105 calculates an average value DCV of the sample data a[n] (n=na to nb) during the section X detected at Step S202 (Step S203). CPU 105 then subtracts the average value DCV from the sample data a[n] (n=1 to N) constituting the impulse response waveform data (Step S204). Steps S203 and S204 can correct a DC offset.

This DC offset is noise components contained in a DC voltage supplied from a power source and results mainly from by the power source. The DC offset exists when the ground, i.e., apparatus ground, is not obtained reliably or in other cases.

After the DC offset is corrected, CPU 105 acquires a maximum value NoiseMax (NoiseMax≧0) among the absolute values of the sample data a[n] (n=na to nb) during the section X (Step S205), and determines the NoiseMax value as the value of the background noise components.

Next, CPU 105 initializes the value [n] to "1" (Step S206), and judges whether the sample data a[n] is a positive value of "0" or larger (Step S207). If the sample data a[n] is a positive value of "0" or larger, CPU 105 executes Step S208.

CPU 105 judges whether the sample data a[n] is the NoiseMax value or larger (Step S208). If the sample data a[n] is the NoiseMax value or larger, CPU 105 subtracts the NoiseMax value from the sample data a[n] to remove the background noise components from the sample data a[n] (Step S209) to thereafter execute Step S214. If CPU 105 judges that the sample data a[n] is neither the NoiseMax value nor larger, the sample data a[n] is changed to "0" to remove the background noise components from the sample data a[n] (Step S210) to thereafter execute Step S214.

If CPU 105 judges at Step S207 that the sample data a[n] is not the positive value of "0" or larger, i.e., the sample data a[n] is a negative value, then CPU 105 judges at Step S211 whether the absolute value (−a[n] of the sample value a[n] is the NoiseMax value or lager. If the absolute value of the sample data a[n] is the NoiseMax value or larger, CPU 105 adds the NoiseMax value to the sample data a[n] to remove the background noise components from the sample data a[n] (Step S212) to thereafter execute Step S214. If CPU 105 judges that the absolute value of the sample data a[n] is neither the NoiseMax value nor larger, the sample data a[n] is changed to "0" to remove the background noise components from the sample data a[n] (Step S213) to thereafter execute Step S214.

After the background noise component eliminating process for one sample data a[n] is completed by the Steps S207 to S213, CPU 105 stores the sample data a[n] with the background noise components having been removed in RAM 103 (Step S214).

Thereafter, CPU 105 increments the value [n] by "1" (Step S215) and judges whether the value [n] is "N+1" (Step S216). If the value "n" is not "N+1", CPU returns to Step S207 whereat the background noise component eliminating process for the sample data a[n] is executed.

If CPU 105 judges that the value [n] is "N+1", it is judged that the background noise component eliminating process for each sample data a[n] (n=1 to N) has been completed. The background noise component eliminating process is therefore terminated and the flow returns to Step S104 of the registration process.

As described above, in the background noise component eliminating process, the background noise components are removed from each sample data a[n] (n=1 to N) constituting the impulse response waveform data. It is therefore possible to eliminate background noise components usually contained in the impulse response waveform data, such as air conditioning sounds and illumination hums in an acoustic space.

Figure 7:
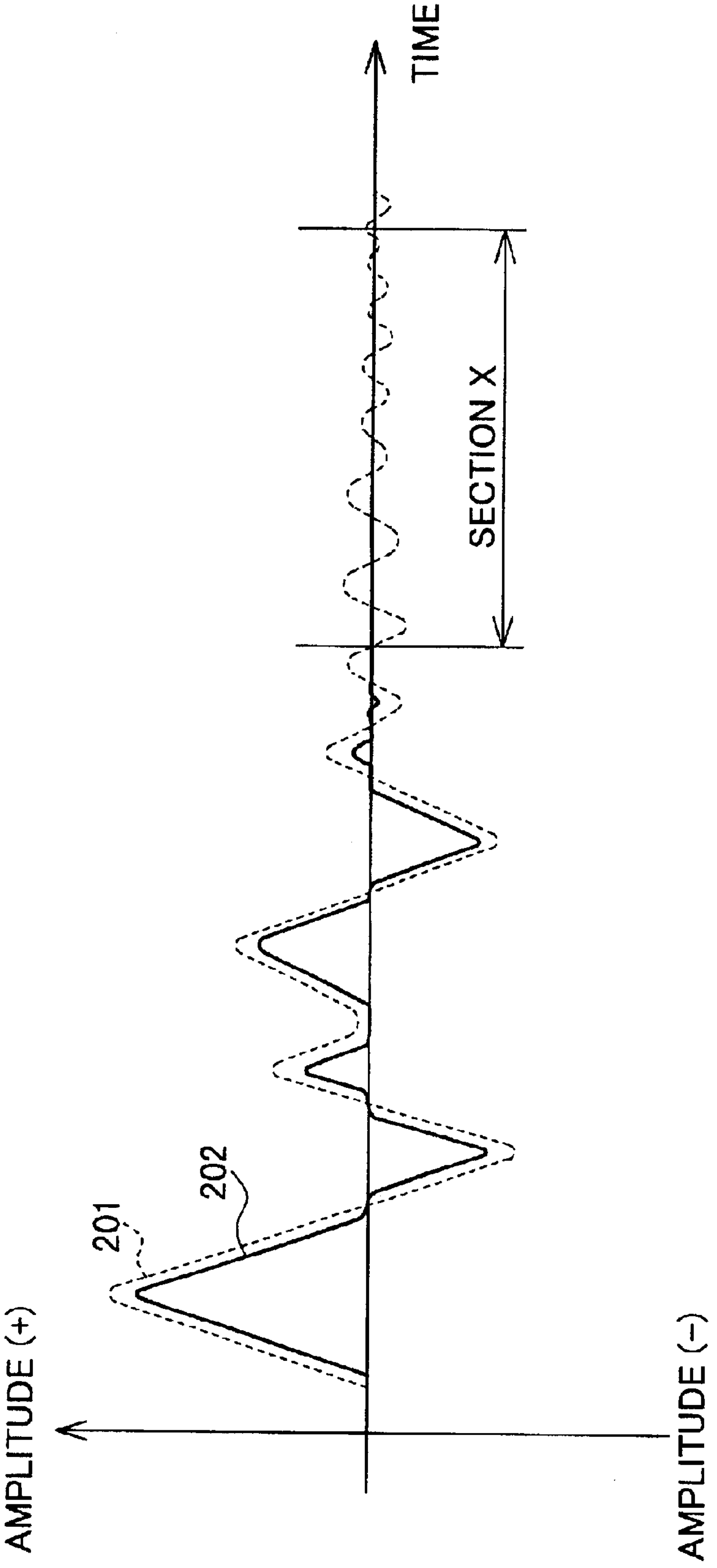

FIG. 7 is a diagram showing examples of an impulse response waveform 201 containing background noise components and an impulse response waveform 202 obtained by removing the background noise components from the impulse response waveform 201 by the background noise component eliminating process.

In FIG. 7, as compared to the impulse response waveform 201 containing background noise components, the impulse response waveform 202 with the background noise components having been removed, has a slightly reduced amplitude of the waveform. This is because the background noise component eliminating process removed the background noise components from each sample data. By removing the background noise components, the impulse response waveform 202 has a waveform amplitude of "0" during the section X.

As described above, the effector 20 can form impulse response waveform data for sound effects with the background noise components having been removed and registers it in the sound effect data memory 107. A process of giving the sound effects is executed by selecting desired impulse response waveform data from those data registered in the sound effect data memory 107 by using keys of the operation unit. The process of giving the sound effects can therefore be executed by using the impulse response waveform data whose DC offset was corrected and whose background sound components were removed. Sounds of good quality with the sound effects can be produced.

B. Modifications

The present invention has been described in connection with the preferred embodiments. The invention is not limited only to the above embodiments. It is apparent that various modifications, improvements, combinations, and the like can be made by those skilled in the art. Following modifications may be used.

(First Modification)

In the background noise component eliminating process of the above-described embodiment, the maximum value NoiseMax is acquired at Step S205 from the absolute values of sample data a[n] (n=na to nb) during the section X, and this NoiseMax value is used as the value of background noise components. However, for example, an average value of absolute values of the sample data a[n] (n=na to nb) during the section X may be calculated to use this average value as the value of background sound components. The value of background sound components may be determined by other methods so long at it is determined by using one or more sample data a[n] (n=na to nb) during the section X.

(Second Modification)

In the background noise component eliminating process of the above-described embodiment, the background noise components are removed from all sample data constituting the impulse response waveform data. However, for example, the background noise components may be removed from the sample data in a desired section designated by an operator.

In removing the background noise components from each sample data at the start point and following points designated by an operator, an amplitude of the background noise components to be removed may be changed, for example, 1/5, 2/5, 3/5, . . . of the amplitude of the background noise components.

(Third Modification)

Figure 8A:
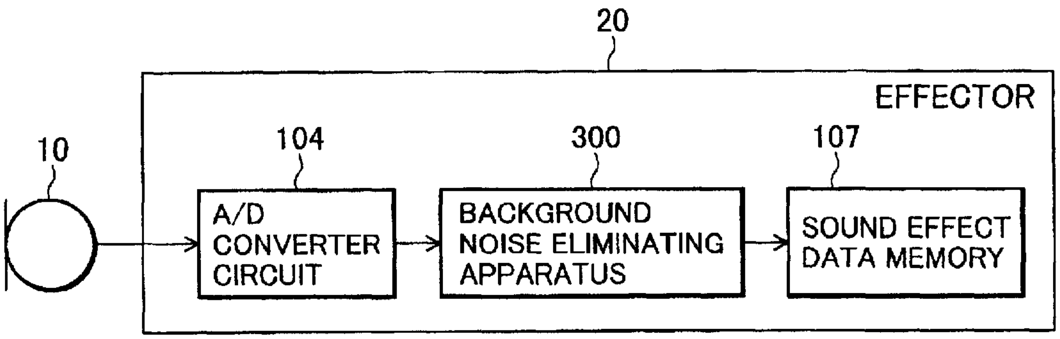
FIGS. 8A to 8D are schematic diagrams illustrating modifications of the embodiment.
Figure 8B:
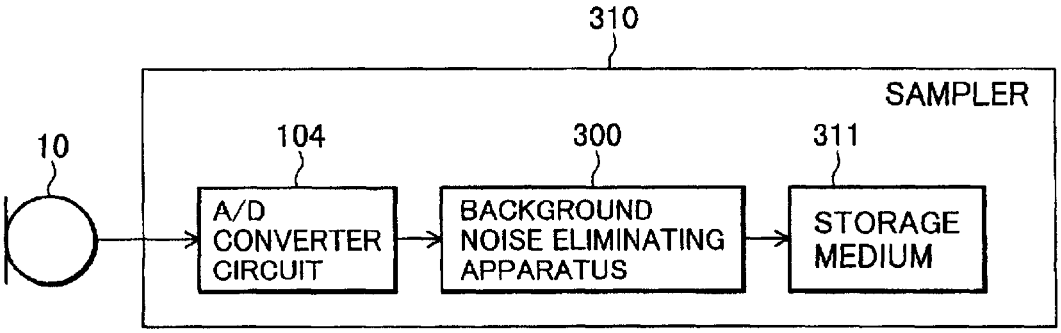

In the above embodiment, as shown in FIG. 8A, a background noise eliminating apparatus 300 having ROM 102, RAM 103 and CPU 105 is built in the effector 20. Background noise components are removed from an impulse response waveform for sound effects. As shown in FIG. 8B, the background noise eliminating apparatus 300 may be built in a sampler 310. In this case, background noise components may be removed when sound sample data such as music data and sound data is acquired and stored in a storage medium 311 such as a digital audio tape (DAT).

Figure 8C:
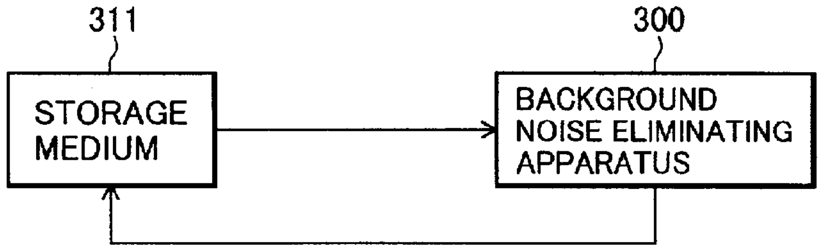
Figure 8D:
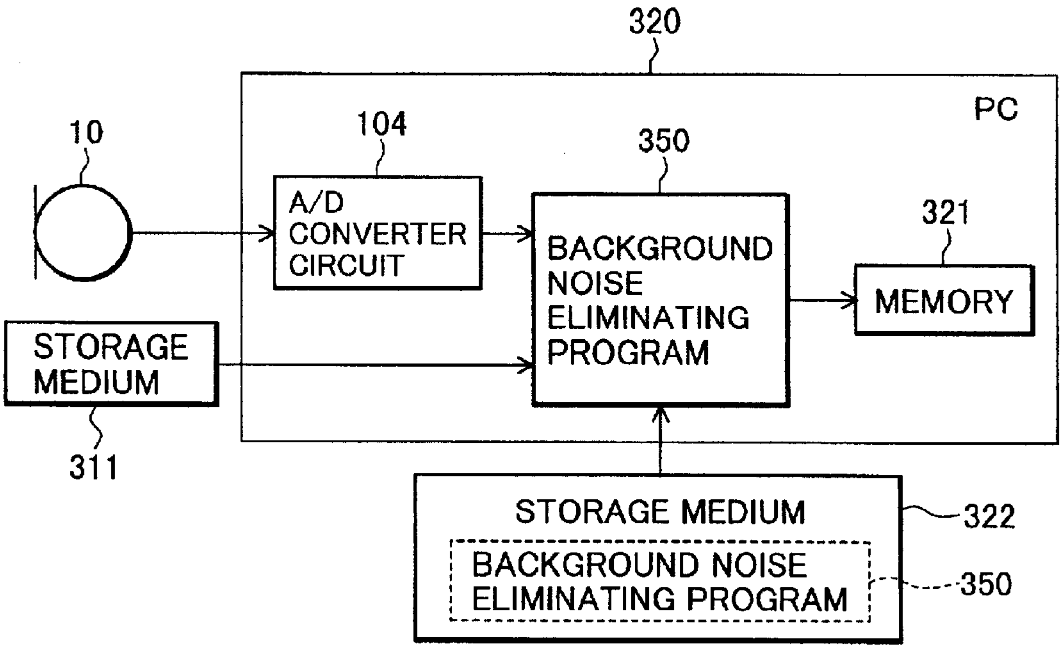

As shown in FIG. 8C, background noise components may be removed from sound sample data stored in a storage medium 311. As shown in FIG. 8D, a background noise component eliminating program 350 for realizing the background noise eliminating function of the embodiment may be stored in a storage medium 322 which can be read with a personal computer (PC) 320. In this case, the background noise eliminating function is realized by PC 320 by reading the background noise eliminating program 350 from the storage medium 322. In this case, the background noise eliminating function of the embodiment may be distributed and sold as storage media 322.

What are claimed are:

1. A background noise eliminating apparatus, comprising:

an envelope detector that detects an envelope of an impulse response waveform from a sample data sequence of the impulse response waveform including background noise;

a section detector that detects a section during which a slope of the envelope detected by said envelope detector equals a value in a predetermined range including "0" for at least a predetermined time;

a determining device that determines a background noise component value in accordance with sample data of the impulse response waveform during the section detected by said section detector; and a background noise component eliminator that reduces an absolute value of the sample data of the impulse response waveform by the background noise component value determined by said determining device.

2. A background noise eliminating apparatus, comprising:

an envelope detector that detects an envelope of an impulse response waveform from a sample data sequence of the impulse response waveform;

a section detector that detects a section during which a slope of the envelope detected by said envelope detector equals a value in a predetermined range including "0" for at least a predetermined time;

a subtracting device that determines a DC offset component value in accordance with sample data of the impulse response waveform during the section detected by said section detector, and subtracts the DC offset component value from the sample data of the impulse response waveform;

a determining device that determines a background noise component value in accordance with the sample data, during the section detected by said section detector, of the impulse response waveform reduced by the DC offset component value by said subtracting device; and a background noise component eliminator that reduces an absolute value of the sample data of the impulse response waveform subtracted by said subtracting device by the DC offset component value, by the background noise component value determined by said determining device.

3. A background noise eliminating apparatus according to claim 1, wherein said determining device determines a value of a maximum sample data having a largest absolute value among the sample data of the impulse response waveform during the section detected by said section detector, as the background noise component value.

4. A background noise eliminating apparatus, comprising:

envelope detecting means for detecting an envelope of an impulse response waveform from a sample data sequence of the impulse response waveform including background noise;

section detecting means for detecting a section during which a slope of the envelope detected by said envelope detecting means equals a value in a predetermined range including "0" for at least a predetermined time;

determining means for determining a background noise component value in accordance with sample data of the impulse response waveform during the section detected by said section detecting means; and background noise component eliminating means for reducing an absolute value of the sample data of the impulse response waveform by the background noise component value determined by said determining means.

5. A background noise eliminating apparatus, comprising:

envelope detecting means for detecting an envelope of an impulse response waveform from a sample data sequence of the impulse response waveform;

section detecting means for detecting a section during which a slope of the envelope detected by said envelope detecting means equals a value in a predetermined range including "0" for at least a predetermined time;

subtracting means for determining a DC offset component value in accordance with sample data of the impulse response waveform during the section detected by said section detecting means, and subtracting the DC offset component value from the sample data of the impulse response waveform;

determining means for determining a background noise component value in accordance with the sample data, during the section detected by said section detecting means, of the impulse response waveform reduced by the DC offset component value by said subtracting means; and background noise component eliminating means for reducing an absolute value of the sample data of the impulse response waveform subtracted by said subtracting means by the DC offset component value, by the background noise component value determined by said determining means.

6. A background noise eliminating apparatus according to claim 5, wherein said determining means determines a value of a maximum sample data having a largest absolute value among the sample data of the impulse response waveform during the section detected by said section detecting means, as the background noise component value.

7. A background noise eliminating method, comprising the steps of:

(a) detecting an envelope of an impulse response waveform from a sample data sequence of the impulse response waveform including background noise;

(b) detecting a section during which a slope of the envelope detected by said step (a) equals a value in a predetermined range including "0" for at least a predetermined time;

(c) determining a background noise component value in accordance with sample data of the impulse response waveform during the section detected by said step (b); and (d) reducing an absolute value of the sample data of the impulse response waveform by the background noise component value determined by said step (c).

8. A storage medium storing a program, which a computer executes to realize a background noise eliminating process, comprising the instructions of:

(a) detecting an envelope of an impulse response waveform from a sample data sequence of the impulse response waveform including background noise;

(b) detecting a section during which a slope of the envelope detected by said instruction (a) equals a value in a predetermined range including "0" for at least a predetermined time;

(c) determining a background noise component value in accordance with sample data of the impulse response waveform during the section detected by said instruction (b); and (d) reducing an absolute value of the sample data of the impulse response waveform by the background noise component value determined by said instruction (c).

9. A background noise eliminating apparatus, comprising:

an envelope detector that detects an envelope of an impulse response waveform from a sample data sequence of the impulse response waveform including background noise;

a section detector that detects a section during which a slope of the envelope detected by said envelope detector remains near zero for at least a predetermined time;

a determining device that determines a background noise component value in accordance with sample data of the impulse response waveform during the section detected by said section detector; and a background noise component eliminator that reduces an absolute value of the sample data of the impulse response waveform by the background noise component value determined by said determining device.

10. A background noise eliminating apparatus according to claim 9, wherein said determining device determines a value of a maximum sample data having a largest absolute value among the sample data of the impulse response waveform during the section detected by said section detector, as the background noise component value.

11. A background noise eliminating apparatus, comprising:

an envelope detector that detects an envelope of an impulse response waveform from a sample data sequence of the impulse response waveform;

a section detector that detects a section during which a slope of the envelope detected by said envelope detector remains near zero for at least a predetermined time;

a subtracting device that determines a DC offset component value in accordance with sample data of the impulse response waveform during the section detected by said section detector, and subtracts the DC offset component value from the sample data of the impulse response waveform;

a determining device that determines a background noise component value in accordance with the sample data, during the section detected by said section detector, of the impulse response waveform reduced by the DC offset component value by said subtracting device; and a background noise component eliminator that reduces an absolute value of the sample data of the impulse response waveform subtracted by said subtracting device by the DC offset component value, by the background noise component value determined by said determining device.

12. A background noise eliminating method, comprising the steps of:

(a) detecting an envelope of an impulse response waveform from a sample data sequence of the impulse response waveform including background noise;

(b) detecting a section during which a slope of the envelope detected by said step (a) remains near zero for at least a predetermined time;

(c) determining a background noise component value in accordance with sample data of the impulse response waveform during the section detected by said step (b); and (d) reducing an absolute value of the sample data of the impulse response waveform by the background noise component value determined by said step (c).

13. A storage medium storing a program, which a computer executes to realize a background noise eliminating process, comprising the instructions of:

(a) detecting an envelope of an impulse response waveform from a sample data sequence of the impulse response waveform including background noise;

(b) detecting a section during which a slope of the envelope detected by said instruction (a) remains near zero for at least a predetermined time; (c) determining a background noise component value in accordance with sample data of the impulse response waveform during the section detected by said instruction (b); and (d) reducing an absolute value of the sample data of the impulse response waveform by the background noise component value determined by said instruction (c).

14. A background noise eliminating apparatus, comprising:

an envelope detector that detects an envelope of an impulse response waveform from a sample data sequence of the impulse response waveform including background noise;

a section detector that detects a section during which a slope of the envelope detected by said envelope detector remains steady for at least a predetermined time;

a determining device that determines a background noise component value in accordance with sample data of the impulse response waveform during the section detected by said section detector; and a background noise component eliminator that reduces an absolute value of the sample data of the impulse response waveform by the background noise component value determined by said determining device.

15. A background noise eliminating apparatus, comprising:

an envelope detector that detects an envelope of an impulse response waveform from a sample data sequence of the impulse response waveform;

a section detector that detects a section during which a slope of the envelope detected by said envelope detector remains steady for at least a predetermined time;

a subtracting device that determines a DC offset component value in accordance with sample data of the impulse response waveform during the section detected by said section detector, and subtracts the DC offset component value from the sample data of the impulse response waveform;

a determining device that determines a background noise component value in accordance with the sample data, during the section detected by said section detector, of the impulse response waveform reduced by the DC offset component value by said subtracting device; and a background noise component eliminator that reduces an absolute value of the sample data of the impulse response waveform subtracted by said subtracting device by the DC offset component value, by the background noise component value determined by said determining device.

* * * * *